United States Patent
Wilder et al.

(10) Patent No.: US 9,731,721 B1
(45) Date of Patent: Aug. 15, 2017

(54) LINE LOCK BRAKING SYSTEM AND METHOD FOR A VEHICLE

(71) Applicants: James M Wilder, Farmington Hills, MI (US); Jeremy J Anker, Lake Orion, MI (US); Jeffrey Uehlein, Farmington Hills, MI (US); Paul Rodriguez, White Lake, MI (US); Farhan Ehsan, Windsor (CA)

(72) Inventors: James M Wilder, Farmington Hills, MI (US); Jeremy J Anker, Lake Orion, MI (US); Jeffrey Uehlein, Farmington Hills, MI (US); Paul Rodriguez, White Lake, MI (US); Farhan Ehsan, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/041,374

(22) Filed: Feb. 11, 2016

(51) Int. Cl.
*B60W 30/18* (2012.01)
*B60W 10/184* (2012.01)
*B60W 10/30* (2006.01)

(52) U.S. Cl.
CPC .... *B60W 30/18027* (2013.01); *B60W 10/184* (2013.01); *B60W 10/30* (2013.01); *B60W 30/18109* (2013.01); *B60W 2510/0638* (2013.01); *B60W 2510/107* (2013.01); *B60W 2510/18* (2013.01); *B60W 2510/30* (2013.01); *B60W 2520/10* (2013.01); *B60W 2530/20* (2013.01); *B60Y 2300/18025* (2013.01)

(58) Field of Classification Search
CPC .............. B60W 30/18027; B60T 8/321; B60T 8/17616; B60T 13/18; B60T 8/3255; B60T 8/172; B60T 8/173; B60T 8/00
See application file for complete search history.

(56) References Cited

U.S. PATENT DOCUMENTS

| | | | | |
|---|---|---|---|---|
| 4,602,824 A | * | 7/1986 | Nishimura | B60T 8/17616 303/116.1 |
| 4,680,714 A | * | 7/1987 | Kubo | B60T 8/321 303/176 |
| 5,019,984 A | * | 5/1991 | Masaki | B60T 8/172 303/172 |
| 5,067,778 A | * | 11/1991 | Testardi | B60T 8/00 303/113.1 |
| 5,707,117 A | | 1/1998 | Hu et al. | |
| 5,781,869 A | | 7/1998 | Parlett, Jr. et al. | |

(Continued)

*Primary Examiner* — Yuri Kan
(74) *Attorney, Agent, or Firm* — Ralph E. Smith

(57) ABSTRACT

A line lock braking system includes a brake module configured to selectively apply hydraulic braking pressure against first wheels and second wheels of the vehicle, and a controller in signal communication with the brake module. The controller initiates, upon receipt of a request, a vehicle line lock mode and performs line lock braking of the vehicle where the brake module is controlled to selectively apply braking pressure against the first wheels and not the second wheels such that the second wheels are free to rotate based on a throttle applied by a driver; completes the line lock mode upon release of a button being depressed to enter and maintain activation of the line lock mode such that the braking pressure against the first wheels is released; and cancels the line lock mode upon determining a number of rotations of the second wheels exceeds a predetermined number of wheel rotations.

18 Claims, 3 Drawing Sheets

(56) References Cited

U.S. PATENT DOCUMENTS

| | | | |
|---|---|---|---|
| 5,952,564 A * | 9/1999 | Naito | B60T 8/173 |
| | | | 73/115.01 |
| 6,166,629 A | 12/2000 | Hamma et al. | |
| 6,406,103 B1 | 6/2002 | Elliott et al. | |
| 6,428,118 B1 | 8/2002 | Blosch | |
| 6,954,690 B2 | 10/2005 | Watanabe et al. | |
| 7,136,729 B2 | 11/2006 | Salman et al. | |
| 8,175,785 B2 | 5/2012 | Turski et al. | |
| 8,297,717 B2 | 10/2012 | Mlynarczyk et al. | |
| 2001/0004168 A1 * | 6/2001 | Onogi | B60T 8/172 |
| | | | 303/199 |
| 2004/0164608 A1 * | 8/2004 | Ohtsuki | B60T 8/3255 |
| | | | 303/20 |
| 2007/0096557 A1 | 5/2007 | Tamai et al. | |
| 2008/0001472 A1 * | 1/2008 | Terasaka | B60T 13/18 |
| | | | 303/11 |
| 2008/0004766 A1 | 1/2008 | Gallo et al. | |
| 2008/0015761 A1 | 1/2008 | Bellego | |
| 2011/0175438 A1 | 7/2011 | Mlynarczyk et al. | |

* cited by examiner

LINE LOCK BRAKING SYSTEM AND METHOD FOR A VEHICLE

FIELD

The present application relates generally to a vehicle braking system and, more particularly, to a vehicle braking system for selectively providing a line lock condition.

BACKGROUND

In some vehicle launch scenarios, to increase performance of the vehicle at take-off, drivers can perform a controlled spinning of the rear tires (e.g., a burnout), which warms the tires and improves grip with the road or track surface. However, in order to perform the controlled burnout, a driver is typically required to manipulate the service brake system to allow the rear wheels to spin freely while the front wheels are held stationary by the brake system. Moreover, the driver may be required to perform multiple tasks such as simultaneously interacting with the throttle, brake, and clutch, which may be difficult to safely or correctly perform.

Aftermarket systems have been proposed to assist the driver with the controlled burnout. However, some such systems pose reliability issues and do not provide an automated, electrical control of the burnout. Other brake line lock systems have been developed for inclusion with the original vehicle equipment. However, such systems have drawbacks including time-based controls that prevent the controlled burnout after a certain period of time even though the driver still desires to perform the action. Accordingly, while such systems work for their intended purpose, it is desirable to provide an improved vehicle line lock braking system.

SUMMARY

In accordance with one example aspect of the invention, a line lock braking system for a vehicle is provided. The line lock braking system includes a brake module configured to selectively apply hydraulic braking pressure against first wheels and second wheels of the vehicle, and a controller in signal communication with the brake module. The controller is configured to upon receipt of a request, initiate a vehicle line lock mode and perform a line lock braking of the vehicle where the brake module is controlled to selectively apply hydraulic braking pressure against the first wheels and not the second wheels such that the second wheels are free to rotate based on a throttle applied by a driver of the vehicle; monitor a number of wheel rotations of the second wheels while the first wheels are maintained in a substantially stationary state by the brake module; complete the vehicle line lock mode, upon release of a button being depressed to enter and maintain activation of the line lock mode, such that the braking pressure against the first wheels is released; and cancel the vehicle line lock mode upon determining the number of wheel rotations of the second wheels exceeds a predetermined number of rotations during the vehicle line lock mode.

According to another example aspect of the invention, a method of performing vehicle line lock braking is provided. The method includes receiving at a controller a request for a vehicle line lock mode, initiating the vehicle line lock mode when the request is received by applying hydraulic braking pressure against first wheels and not second wheels of the vehicle such that the second wheels are free to rotate based on a throttle applied by a driver of the vehicle; and monitoring a number of wheel rotations of the second wheels while the first wheels are maintained in a substantially stationary state by a brake module. The vehicle line lock mode is completed upon release of a button being depressed to enter and maintain activation of the line lock mode, such that the braking pressure against the first wheels is released; and the vehicle line lock mode is canceled upon determining the number of wheel rotations of the second wheels exceeds a predetermined number of rotations during the vehicle line lock mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
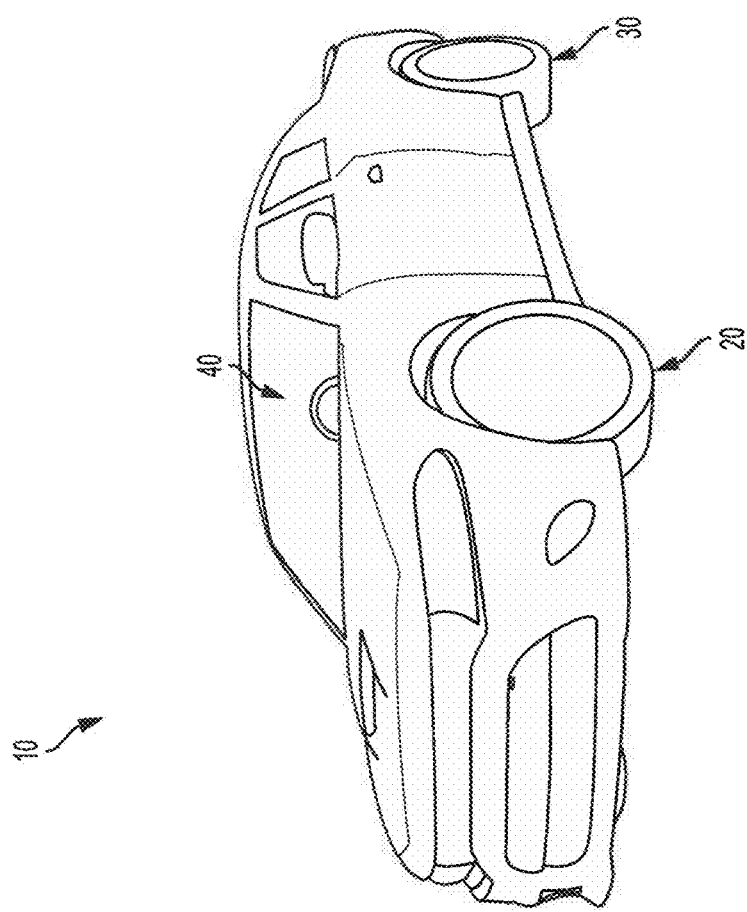
FIG. 1 is a perspective view of an example vehicle in accordance with the principles of the present disclosure.

With initial reference to FIG. 1, an example vehicle is illustrated and generally identified at reference numeral 10. The vehicle 10 includes a line locking braking system configured to selectively transition the vehicle from a normal mode to a line lock braking mode where vehicle front wheels 20 are locked and a braking pressure is selectively released on vehicle rear wheels 30. This enables the driver to apply the throttle to rotate the rear wheels 30 and perform a controlled burnout. Additionally, the described line lock feature will deactivate when the rear wheels 30 have rotated a predetermined number of times, the driver manually aborts the feature, or the vehicle/system detects a fault or error. The vehicle then returns to the normal operating mode behavior after the line lock feature has been deactivated.

Figure 2:
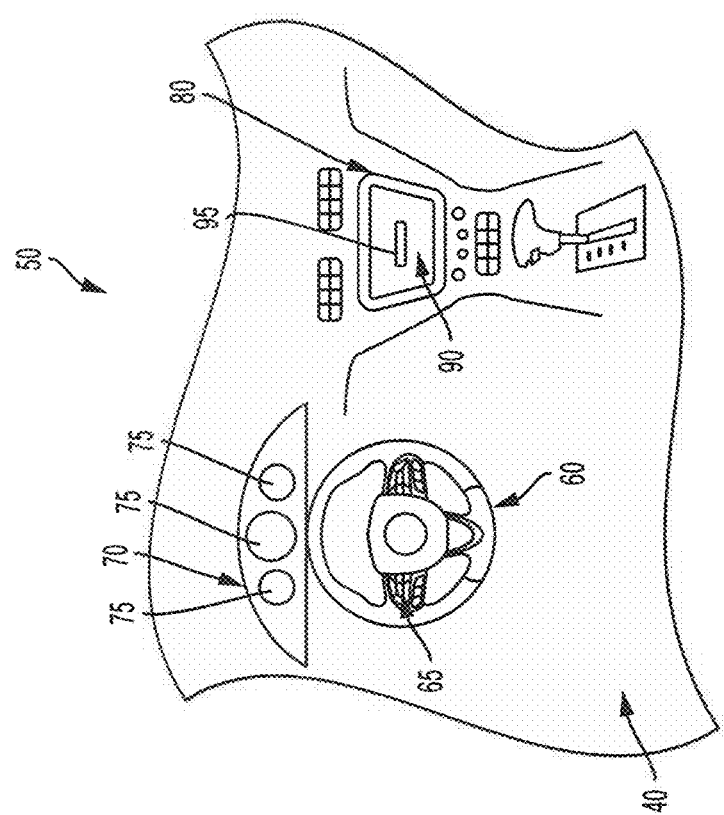
FIG. 2 is a front view of an example driver control system in accordance with the principles of the present disclosure.

With additional reference to FIG. 2, the vehicle 10 includes a vehicle interior 40 having a driver control system 50, which generally comprises a steering wheel 60, an instrument cluster 70, and a display 80 having a user interface 90. The driver control system 50 is in signal communication with the line locking braking system, and enables the driver to activate and deactivate the line lock braking mode. Moreover, in one exemplary implementation, the driver control system 50 assists the driver in performing the controlled burnout when the line lock braking mode is activated, for example, through a sequence of audio and/or visual cues.

The steering wheel 60 may include one or more buttons 65 located thereon that may be utilized during the line lock braking mode. For example, button 65 may be required to be held down during at least a portion of a line lock braking mode sequence, as will be discussed in greater detail below.

The instrument cluster 70 may include one or more displays 75 configured to provide information to the driver such as, for example, vehicle speed or engine rotational speed. The instrument cluster displays 75 may be utilized to provide information or direction to the driver during the line lock braking mode. For example, the displays 75 may provide a series of directions to the driver to enable the vehicle to perform the controlled burnout.

The display 80 includes user interface 90, which is configured to provide audio/visual information related to the line lock braking system and mode to the driver. For example, the user interface 90 may be a touch-screen configured to display one or more soft keys 95 programmed to perform a specific function when selected. In one example implementation, soft key 95 may be selected by the driver to request the line lock braking mode. Once selected, the user interface 90 can display various information related to the line lock braking mode. For example, user interface 90 may display whether one or more vehicle conditions are satisfied that will enable activation of the line lock braking mode. If the conditions are not satisfied, the user interface 90 may display information regarding the unsatisfied condition, and may subsequently deactivate the line lock braking mode or otherwise prevent initiation of the controlled burnout.

Additionally, user interface 90 may provide audio communications to the driver in place of or in addition to visual displays. Moreover, the user interface 90 may also receive audio commands from the driver. However, the driver control system 50 is not limited solely to the function described herein and may be utilized in various other ways to control the line lock braking system and associated controlled burnout.

Figure 3:
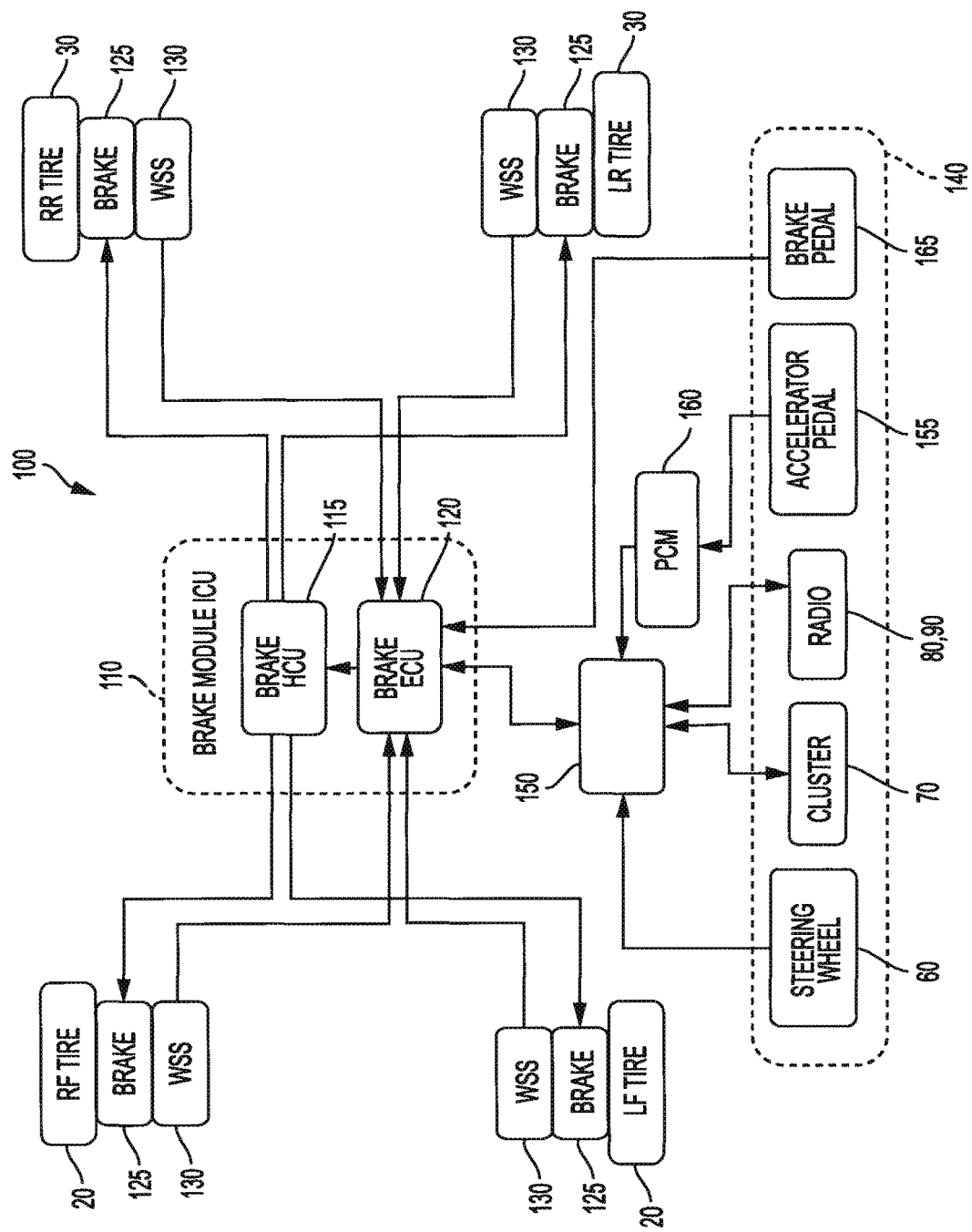
FIG. 3 is a schematic view of an example vehicle control system in accordance with the principles of the present disclosure.

FIG. 3 illustrates a vehicle control system 100 according to one exemplary implementation. The vehicle control system 100 may be in signal communication with the driver control system 50 and may be utilized as the line lock braking system for operating vehicle 10 in the line lock braking mode. As shown, the vehicle control system 100 generally includes a controller or brake module integrated control unit (ICU) 110 having a brake hydraulic control unit (HCU) 115 and a brake electronic control unit (ECU) 120. It will be appreciated that the brake controller or module can be implemented in various other forms. As used herein, the term controller, module, or control unit refers to an application specific integrated circuit (ASIC), an electronic circuit, a processor (shared, dedicated, or group) and memory that executes one or more software or firmware programs, a combinational logic circuit, and/or other suitable components that provide the described functionality.

The brake HCU 115 is coupled to a plurality of braking devices 125 each located at one of the vehicle wheels 20, 30. The brake HCU 115 is configured to selectively direct hydraulic fluid to the braking devices 125 to apply hydraulic braking pressure against that wheel 20, 30. As such, during the line lock braking mode, the brake HCU 115 can selectively apply hydraulic braking pressure against front wheels 20 while releasing hydraulic braking pressure against the rear wheels 30. The braking devices 125 may be any suitable type of brake such as for example, disc brakes, drum brakes, electronic brakes, or the like.

The brake ECU 120 is in signal communication with a plurality of wheel speed sensors 130 each located at one of the vehicle wheels 20, 30. The brake ECU 120 is configured to receive a signal from the wheel speed sensors 130 indicating a number of rotations performed by the vehicle wheels 20, 30. For example, the signal may indicate tone wheel pulses, which can be utilized to calculate the number of rotations of wheels 20, 30. The number of rotations of rear wheels 30 may then be used to determine when the controlled burnout is stopped. For example, the line lock braking mode may be deactivated when the number of rotations of the rear wheels 30 exceeds a predetermined number. In one example, the predetermined number of rotations is between approximately 300 and approximately 500. In another example, the predetermined number of rotations is between 300 and 500. In yet another example, the predetermined number of rotations is approximately 400. In yet another example, the predetermined number of rotations is 400.

However, it will be appreciated that the number of wheel rotations may be adjusted based on various factors such as, for example, weather conditions, ambient temperature, track surface temperature, and tire type. For example, network controller 150 may request various inputs/conditions and vary the wheel rotation threshold accordingly such as by using an algorithm for such purposes.

Driver input devices 140 are in signal communication with the brake ECU 120 either directly or through a network controller 150. The driver input devices 140 are configured to provide information and/or control the controller 150, which controls the brake ECU 120. For example, the driver input devices 140 can be utilized to activate the line lock braking mode and/or perform portions of the line lock braking sequence. As illustrated in the example implementation of FIG. 2, driver input devices 140 can include steering wheel 60, instrument cluster 70, user interface 90, an accelerator pedal 155 and associated powertrain control module 160, and a brake pedal 165. However, the network controller 150 may be in signal communication with various other vehicle control modules and/or sensors.

The network controller 150 is configured to control the distribution of hydraulic fluid between the brake HCU 115 and the individual braking devices 125 based on information received from a vehicle system or the driver (e.g., via the driver input devices 140). As such, the network controller 150 is configured to activate and deactivate the line lock braking mode.

Figure 4:
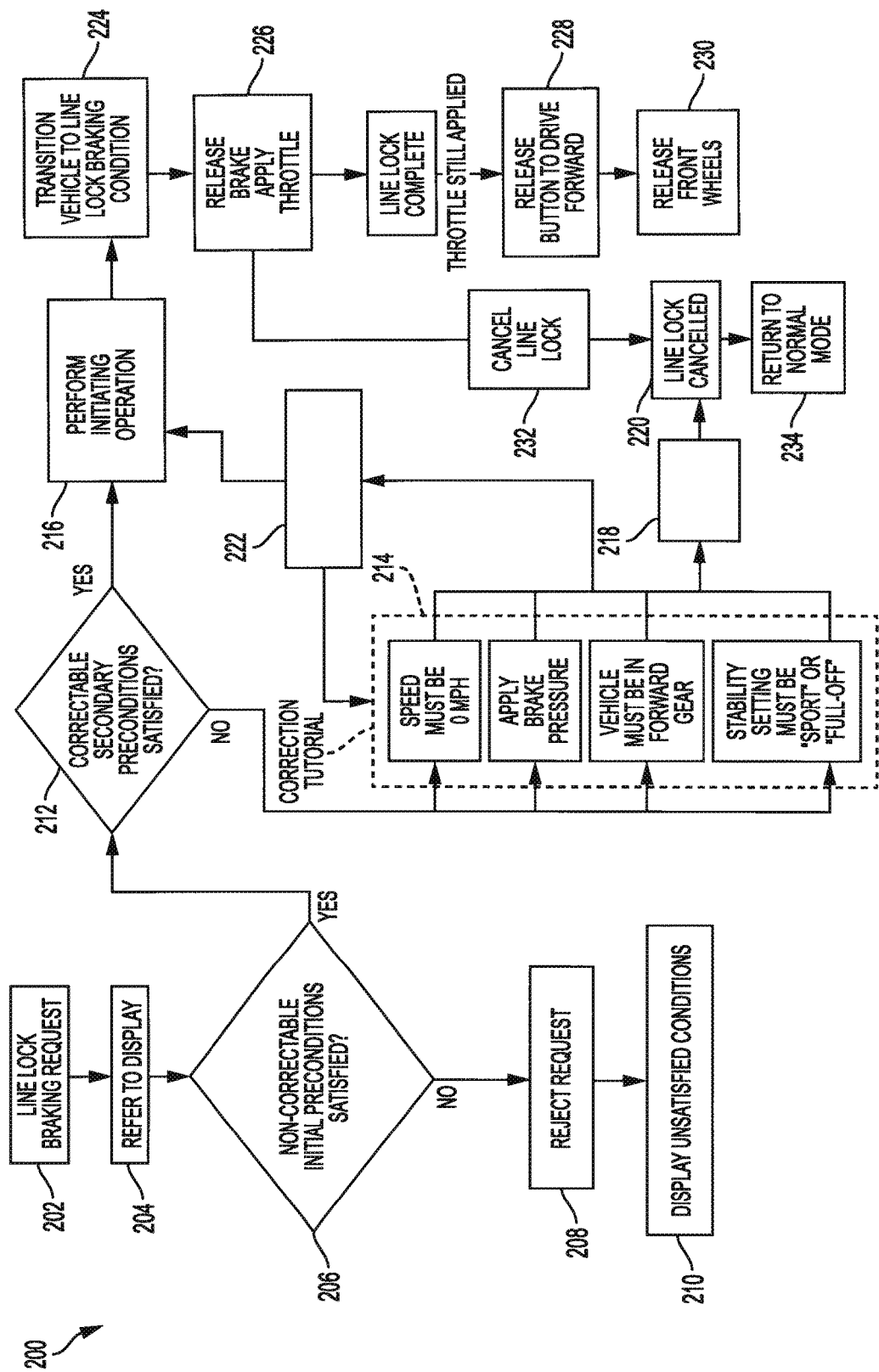
FIG. 4 is a flow control diagram of an example method of controlling a vehicle in accordance with the principles of the present disclosure.

FIG. 4 illustrates an example method 200 of line lock braking a vehicle for a controlled burnout. The method 200 generally includes (I) receiving a request for a line lock braking mode, (II) checking initial vehicle preconditions for entering the line lock braking mode, (III) checking secondary vehicle conditions for entering the line lock braking mode, (IV) activating the line lock braking, and (V) deactivating the line lock braking after a predetermined condition occurs such as, for example, upon a driver releasing button 65 or when the rear wheels exceed a predetermined number of rotations during the line lock.

In one exemplary implementation, at step 202, controller 150 receives a signal indicating a driver request for the line lock braking mode. For example, the driver may initiate the request by selecting soft key 95 of the user interface 90 or by providing an audio command to the driver control system 50. At step 204, controller 150 directs the driver to refer to the instrument cluster 70. For example, display 80 may provide an audio or visual indicator to the driver to refer to the instrument cluster 70.

At step 206, controller 150 confirms one or more non-correctable or initial vehicle preconditions are satisfied. Each of the initial vehicle preconditions must be satisfied to enter the line lock mode. In one exemplary implementation, the initial vehicle preconditions include one or more of the following: (a) the internal vehicle speed is less than or equal to 10 MPH; (b) the engine RPM is greater than 500 RPM; (c) a temperature of the transmission is not over a predetermined temperature (e.g., approximately 140° C.; (d) the engine is running; (e) no current active electronic stability control (ESC) faults that inhibit line lock are present (e.g., wheel speed sensor faults, brake pressure sensor faults, internal module faults, yaw sensor faults, or any other faults that affect the integrity of the function); (f) a radiator coolant temperature is less than approximately 250° F.; (g) the odometer is greater than a predetermined number (e.g., 500 miles); (h) a valet mode is not active (e.g., where a drive mode is requested by the vehicle owner to limit the functionality of the vehicle such as reduced engine power); (i) vehicle doors are closed; (j) cruise control is not enabled or active; and (h) launch control is not active (e.g., a system that assists the driver in maintaining a set engine speed prior to launch and then manages wheel slip from launch to a predetermined speed, thereby providing a reliable and consistent acceleration profile). However, step 206 is not limited to the above described preconditions and may include additional initial vehicle preconditions.

If one or more of the initial vehicle preconditions are not satisfied, at step 208, controller 150 rejects the line lock braking mode request. At step 210 controller 150 may provide a message to the driver via driver control system 50 indicating that the line lock request has been rejected. For example, display 80 may provide a message indicating that the line lock is unavailable and the reason(s) that the line lock is unavailable (i.e., which initial preconditions were not satisfied). For example, display 80 may indicate that the vehicle speed is too high, the engine speed is too low, the coolant temperature is too high, a vehicle door is open, etc.

If all of the initial vehicle preconditions are met, control proceeds to step 212 where controller 150 confirms one or more correctable or secondary vehicle preconditions are satisfied. In one exemplary implementation, the secondary vehicle preconditions include one or more of the following: (i) the vehicle speed is zero MPH; (ii) the brake pedal pressure is greater than a predetermined pressure (e.g., greater than 50 bar); (iii) in an automatic transmission, the transmission is in a forward gear (e.g., drive); (iv) in a manual transmission, the transmission is not in reverse (R); and (v) the vehicle traction control or stability setting must be "sport" or "full-off". However, step 212 is not limited to the above described preconditions and may include additional secondary vehicle preconditions.

Each of the secondary vehicle preconditions must be satisfied to enter the line lock mode. However, unlike the initial vehicle preconditions, if one or more of the secondary preconditions is not satisfied, at step 214, the controller 150 may invite the driver to remedy the unsatisfied secondary preconditions. For example, if one of the secondary preconditions is not satisfied, controller 150 may display a tutorial on the instrument cluster 70 or display 80 that provides directions or assistance to the driver to remedy the unsatisfied condition. Moreover, controller 150 may only display one active correctable secondary precondition at a time until that secondary precondition is corrected.

In one exemplary implementation, if secondary precondition (i) is not satisfied, instrument cluster 70 displays a message indicating that the vehicle speed must be zero MPH. If secondary precondition (ii) is not satisfied, instrument cluster 70 displays a message directing the driver to apply pressure to the brake pedal. If secondary precondition (iii) is not satisfied, instrument cluster 70 displays a message indicating that the vehicle must be in a forward gear. If secondary precondition (v) is not satisfied, instrument cluster 70 displays a message indicating that the stability setting must be "sport" or "full-off".

If all of the secondary vehicle preconditions are met, whether initially or through the tutorial of step 214, control then proceeds to step 216. However, if at step 218, an initial precondition occurs during or immediately after tutorial steps 214, control proceeds to step 220 where the line lock braking mode is canceled. If a secondary precondition occurs or is re-enabled at step 222, control returns to the tutorial step 214 to attempt to remedy the precondition.

At step 216, once all of the secondary preconditions are satisfied, controller 150 directs the driver to perform an operation to activate the line lock braking. For example, controller 150 may display a message on instrument cluster 70 directing the driver to press and hold button 65 on the steering wheel 60. If the operation is performed correctly, at step 224, controller 150 subsequently transitions the vehicle to the line lock braking condition by releasing brake pressure from the rear wheels 30 and maintaining brake pressure at the front wheels 20. In other words, the braking pressure is maintained or locked in the braking system lines and components associated with the front wheels 20 in an absence of use of brake pedal 165.

At step 226, controller 150 directs the driver to release the brake pedal 165 and apply the throttle (i.e., press the accelerator pedal 155) while the driver continues to hold button 65. At this point, the rear wheels 30 should begin to rotate while the front wheels 20 remain stationary, thereby performing the controlled burnout.

During the controlled burnout, at step 228, controller 150 may display a message to the driver to release or disengage the operation performed in step 216. For example, controller 150 may display a message on instrument cluster 70 directing the driver to release the button 65 to begin forward movement of the vehicle. Moreover, the controller 150 may display the predetermined number of wheel rotations on the instrument cluster 70 and/or the user interface 90 before and/or during the controlled burnout. The controller 150 may also display the number of real-time wheel revolutions throughout the controlled burnout. When the revolutions approach the revolutions threshold, a further message may be displayed to release the button or the line lock will be canceled. At step 230, if button 65 is released before the predetermined number of wheel rotations is exceeded, controller 150 releases the hydraulic pressure at front wheels 20 and the vehicle will drive forward if the throttle is still applied.

However, prior to release of button 65, controller 150 will cancel the line lock braking (step 232) if any of the following conditions occur: (1) the wheel speed sensors 130 indicate the rear wheels 30 have rotated more than the predetermined number of rotations (e.g., 400 revolutions) during the controlled burnout in the line lock braking mode; (2) an initial precondition occurs; (3) a secondary precondition occurs (except for the brake pedal pressure greater than a predetermined pressure); (4) the brake pedal 165 is pressed; (5) the accelerator 155 is released; (6) the vehicle rotates beyond a predetermined angle (e.g., the vehicle rotates or slides more than 15° from a starting position); and (7) a pressure of a rear tire 30 is less than or equal to a predetermined minimum pressure (e.g., zero PSI). However, step 232 is not limited to the above described conditions and may include additional time-independent line lock cancelling conditions.

If any of the above conditions occurs, control proceeds to step 220 and the line lock braking mode is canceled. Thus, the line lock braking system described herein provides the benefit of line lock deactivation without relying on any time-based conditions. For example, the predetermined number of revolutions for the rear tires 30 is dependent on the accelerator pedal 155 position and corresponding requested engine torque. In other words, with lesser pedal depression, there will be fewer tire revolutions per minute and thus a longer burnout period as compared to greater pedal depression, which requests more torque resulting in more rear tire RPM, and thus a shorter burnout period before reaching the predetermined wheel revolutions. In this way, the rear tires are better protected from excessive wear and potential durability issues. More specifically, the revolution threshold directly correlates to wear of the tires and, in one exemplary implementation, is further tunable based on factors that relate to tire wear, such as road surface and tire type. As such, burnout potential is maximized while also accounting for durability of the rear tires 30.

Subsequently, at step 234, controller 150 transitions the accelerator 155 to a dead pedal where accelerator pedal deflection is ignored until the accelerator pedal 155 is completely released. Subsequent pedal deflection may then be used to determine driver input. In one implementation, dead pedal only occurs when the predetermined number of wheel revolutions is exceeded. The vehicle 10 then returns to normal operating behavior once the line lock braking mode is deactivated.

Described herein are system and methods for providing a controlled burnout for a vehicle. A driver control system is in communication with a network controller, which is configured to control a hydraulic brake system. Upon satisfying initial and secondary vehicle preconditions, the controller activates a line lock braking mode where brake pressure is released from the rear wheels and the brake pressure is maintained at the front wheels, thereby enabling the controlled burnout. The line lock braking mode is deactivated when the rear wheels have spun a predetermined number or times, or if the mode is aborted either manually by the driver or automatically by the vehicle/system. The vehicle then returns to normal operating behavior after the line lock braking mode is deactivated. Accordingly, there are no time-out or time based cancellation features or thresholds at any stage or state of the line lock braking feature. Instead, the described system monitors time-independent conditions and deactivates the line lock braking feature based off the number of times the vehicle's rear wheels have rotated.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A line lock braking system for a vehicle, the system comprising:
   brake module integrated control unit (ICU) configured to selectively apply hydraulic braking pressure against front wheels and rear wheels of the vehicle; and
   a controller in signal communication with the brake module, the controller configured to:
   upon receipt of a request, initiate a vehicle line lock mode and perform a line lock braking of the vehicle where the brake module ICU is controlled to selectively apply hydraulic braking pressure against the front wheels and not the rear wheels such that the rear wheels are free to rotate based on a throttle applied by a driver of the vehicle;
   monitor, during the vehicle line lock mode, a number of rotations of the rear wheels while the front wheels are maintained in a substantially stationary state by the brake module ICU;
   upon release of a button being depressed to enter and maintain activation of the vehicle line lock mode, complete the vehicle line lock mode such that the hydraulic braking pressure against the front wheels is released; and
   deactivate the vehicle line lock mode upon determining the number of rotations of the rear wheels exceeds a predetermined number of wheel rotations during the vehicle line lock mode.

2. The system of claim 1, wherein upon canceling the vehicle line lock mode when the predetermined number of wheel rotations is exceeded, the controller is configured to:
   control the brake module ICU to apply hydraulic braking pressure against the rear wheels.

3. The system of claim 1, further comprising a user interface in signal communication with the controller, the controller configured to receive the request from the user interface indicating the driver has selected the vehicle line lock mode.

4. The system of claim 3, wherein the controller is configured to prompt the driver to utilize the user interface to enter information for use in determining the predetermined number of wheel rotations, the information including at least one of a tire type and a track or road surface temperature.

5. The system of claim 4, wherein during the vehicle line lock mode, the controller is configured to cause the user interface to display a real-time running count of the monitored number of rotations of the rear wheels and, upon the monitored number of wheel rotations of the rear wheels approaching the predetermined number of rotations, the controller is configured to cause the user interface to display a message indicating the vehicle line lock mode will be canceled upon the monitored number of rotations of the rear wheels exceeding the predetermined number of rotations.

6. The system of claim 3, further comprising the controller causing the user interface to display a message indicating the vehicle line lock mode has been canceled due to the predetermined number of wheel rotations being exceeded.

7. The system of claim 3, wherein the predetermined number of wheel rotations is between 300 rotations and 500 rotations.

8. The system of claim 3, wherein the controller is configured to determine whether an initial vehicle precondition is satisfied before enabling the vehicle to enter the vehicle line lock mode, the initial precondition including at least one of:
   (a) a speed of the vehicle is less than or equal to 10 MPH;
   (b) an engine RPM is greater than 500 RPM;
   (c) a temperature of a transmission of the vehicle is not over a predetermined temperature;
   (d) the engine is running;
   (e) no current active electronic stability control (ESC) faults are present;
   (f) a radiator coolant temperature is less than approximately 250° F.;
   (g) an odometer is greater than a predetermined number;
   (h) a valet mode is not active;
   (i) vehicle doors are closed; and
   (j) a cruise control is not enabled or active.

9. The system of claim 3, wherein the controller is configured to determine whether a secondary vehicle precondition is satisfied before enabling the vehicle to enter the line lock braking mode, the secondary vehicle precondition including at least one of:
(i) a speed of the vehicle is zero MPH;
(ii) a brake pedal pressure is greater than a predetermined pressure;
(iii) a vehicle transmission is in a forward gear; and
(iv) a vehicle traction control is off.

10. The system of claim 1, wherein the controller is configured to deactivate the vehicle line lock mode if at least one of the following occurs during the vehicle line lock mode:
(1) wheel speed sensors indicate the rear wheels have rotated more than the predetermined number of wheel rotations;
(2) an initial precondition occurs;
(3) a secondary precondition occurs;
(4) a vehicle brake pedal is depressed;
(5) a vehicle accelerator pedal is released;
(6) the vehicle rotates beyond a predetermined angle; and
(7) a pressure of one of the rear wheels is less than or equal to a predetermined minimum pressure.

11. A method of performing vehicle line lock braking, the method comprising:
receiving, at a controller, a request for a vehicle line lock mode;
initiating the vehicle line lock mode when the request is received by applying hydraulic braking pressure against front wheels and not rear wheels of the vehicle such that the rear wheels are free to rotate based on a throttle applied by a driver of the vehicle;
monitoring, during the vehicle line lock mode, a number of rotations of the rear wheels while the front wheels are maintained in a substantially stationary state by a brake module integrated control unit (ICU) of the vehicle;
completing the vehicle line lock mode, upon release of a button being depressed to enter and maintain activation of the vehicle line lock mode, such that the hydraulic braking pressure against the front wheels is released; and
deactivating the vehicle line lock mode upon determining the number of rotations of the rear wheels exceeds a predetermined number of wheel rotations during the vehicle line lock mode.

12. The method of claim 11, wherein upon canceling the vehicle line lock mode when the number of rotations of the rear wheels exceeds the predetermined number of wheel rotations, the controller is further configured to:
control the brake module ICU to apply hydraulic braking pressure against the rear wheels.

13. The method of claim 11, further comprising the controller causing a user interface of the vehicle to display a message to prompt the driver to utilize the user interface to enter information for use in determining the predetermined number of wheel rotations, the information including at least one of a tire type and a track or road surface temperature.

14. The method of claim 11, further comprising the controller causing a user interface of the vehicle to display a message indicating the vehicle line lock mode has been canceled due to the predetermined number of wheel rotations being exceeded.

15. The method of claim 11, further comprising, during the vehicle line lock mode, the controller causing a user interface of the vehicle to display a real-time running count of the monitored number of rotations of the rear wheels and, upon the monitored number of rotations of the rear wheels approaching the predetermined number of wheel rotations, the controller causing the user interface to display a message indicating the vehicle line lock mode will be canceled upon the monitored number of rotations of the rear wheels exceeding the predetermined number of wheel rotations.

16. The method of claim 11, further comprising the controller determining whether an initial vehicle precondition is satisfied before enabling the vehicle to enter the vehicle line lock mode and prevent initiation of the vehicle line lock mode if the initial vehicle precondition is not satisfied, the initial vehicle precondition including at least one of:
(a) a speed of the vehicle is less than or equal to 10 MPH;
(b) an engine RPM is greater than 500 RPM;
(c) a temperature of a transmission of the vehicle is not over a predetermined temperature;
(d) the engine is running;
(e) no current active electronic stability control (ESC) faults are present;
(f) a radiator coolant temperature is less than approximately 250° F.;
(g) an odometer is greater than a predetermined number;
(h) a valet mode is not active;
(i) vehicle doors are closed; and
(j) a cruise control is not enabled or active.

17. The method of claim 16, further comprising:
determining if a secondary vehicle precondition is satisfied;
preventing the vehicle line lock mode if the secondary vehicle precondition is not satisfied; and
directing a driver to correct one or more unsatisfied secondary vehicle preconditions if the secondary vehicle precondition is not satisfied;
wherein the secondary vehicle precondition includes at least one of:
(i) a speed of the vehicle is zero MPH;
(ii) a brake pedal pressure is greater than a predetermined pressure;
(iii) a vehicle transmission is in a forward gear; and
(iv) a vehicle traction control is off.

18. The method of claim 11, further comprising deactivating the vehicle line lock mode if at least one of the following occurs during the vehicle line lock mode:
(1) wheel speed sensors indicate the rear wheels have rotated more than the predetermined number of wheel rotations;
(2) an initial precondition occurs;
(3) a secondary precondition occurs;
(4) a vehicle brake pedal is pressed;
(5) a vehicle accelerator pedal is released;
(6) the vehicle rotates beyond a predetermined angle; and
(7) a pressure of one of the rear wheels is less than or equal to a predetermined minimum pressure.

* * * * *